March 13, 1962      G. MEYER      3,024,940

THERMALLY INSULATED CONTAINERS

Filed May 11, 1961      2 Sheets-Sheet 1

*INVENTOR.*
GERSON MEYER

BY
*Albert J. Kramer*
*ATTORNEY*

March 13, 1962  G. MEYER  3,024,940
THERMALLY INSULATED CONTAINERS
Filed May 11, 1961  2 Sheets-Sheet 2

INVENTOR.
GERSON MEYER
BY
Albert G. Kramer
ATTORNEY

United States Patent Office 3,024,940
Patented Mar. 13, 1962

3,024,940
THERMALLY INSULATED CONTAINERS
Gerson Meyer, Baltimore, Md., assignor to Life-Like Products, Inc., Baltimore, Md., a corporation of Maryland
Filed May 11, 1961, Ser. No. 109,453
3 Claims. (Cl. 220—55)

This invention relates to containers and it is more particularly concerned with containers having thermally insulated walls for the purpose of preventing rapid changes in the temperature of materials placed therein, such as foods of various kinds.

One of the objects of this invention is the provision of a thermally insulated container which is light in weight and yet sturdy in construction.

Another object of this invention is the provision of such containers of substantial size and yet capable of being nested in groups for purposes of conserving space during storage and transportation.

A further object of the invention is the provision of such novel means in combination with such a container for both pivotally attaching a handle thereto and latch means for a lid thereof.

A still further object of the invention is the provision of a container of the type mentioned formed of polystyrene foam and yet permitting the attachment thereto of metal parts comprising the handle and latches in a simple and inexpensive manner.

A still further object of the invention is the provision of such a container which is easy to carry, easy to open and close, and convenient to use generally.

These and still further objects and advantages and features of the invention will appear more fully from the following description and the accompanying drawing which together illustrate and describe an embodiment of the invention presented by way of example and not by way of limitation.

Figure 1:
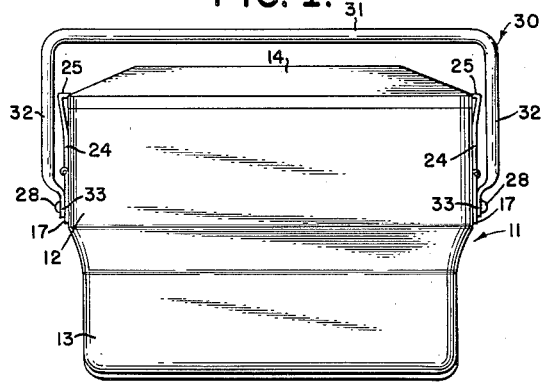
FIG. 1 is a front elevational view of the embodiment with the cover in place and latched.

Referring with more particularity to the drawing in which like numerals designate like parts, the embodiment illustrated comprises a one-piece open top container or box 11 of a rigid heat insulating material, preferably polystyrene foam or other closed cellular plastic material having similar characteristics of thermal insulation, lightness of weight and rigidity.

Figure 7:
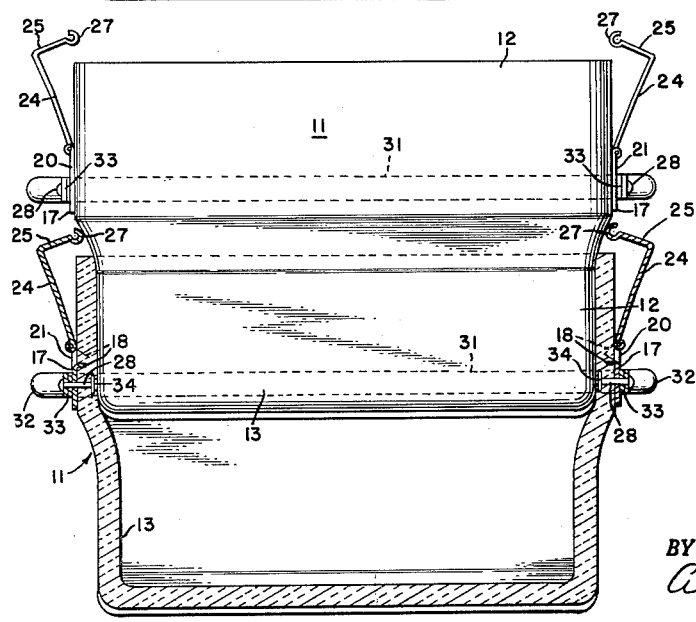
FIG. 7 is a view showing two of the embodiments in nested relation with the lids removed, one being in section and the other in elevation.

The upper section 12 of the box is larger in size than the lower section 13 in an amount sufficient to permit the nesting of a group of the containers, as shown in FIG. 7, for the purpose of conserving space in storage, packing and transportation.

The open top of the container is provided with a cover 14 which, in order to increase the capacity of the container as a whole, is formed in the general shape of a pyrimidal dome or crown. A marginal ridge 15 extends around the bottom edge on the interior of the lid to fit against the inside wall of the container to seat the lid in proper position.

At either end wall of the container, there is secured a combined latch and anchor unit 16 to the upper section 12. Each of these units comprises a plate 17 of metal or other suitable material which is cut and shaped to provide a group of inwardly projecting nibs 18 adjacent an opening 19 at the upper part and a pair of parallel arms 20 and 21 adjacent the opening 19. The upper ends of the arms 20 and 21 are rolled over a hinge pintle 22. The portion of the pintle 22 between the arms 20 and 21 engages the rolled lower end 23 of a latch bar 24 to which it is thus loosely hinged.

The upper end of the bar 24 is bent inwardly to provide a holding finger 25 to register with a recess 26 in the top of the cover 14. The outer end of the finger 25 is provided with a curl 27 to facilitate releasing the latch from its operative position.

The plate 17 is disposed with the nibs 18 embedded in the adjacent end wall of the container. It is held in place by means of a rivet 28 which passes through the wall and an aperture 29 in the plate below the nibs 18.

Figure 2:
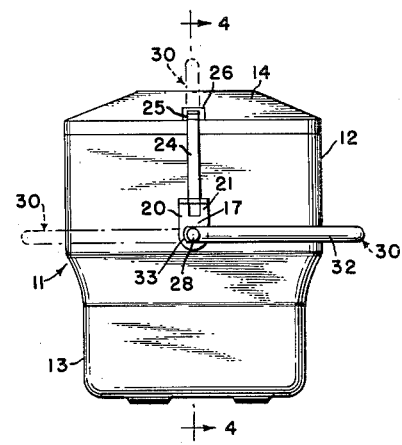
FIG. 2 is an end elevational view showing in broken lines different positions of the handle.
Figure 3:
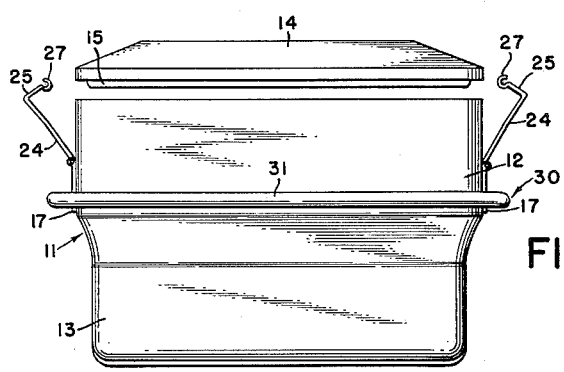
FIG. 3 is a front elevational view similar to FIG. 1 but with the handle in a different position and the lid unlatched and elevated above the body.
Figure 6:
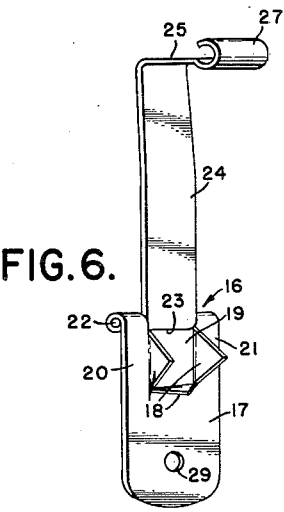
FIG. 6 is a perspective view of one of the latch anchor units apart from the device as a whole.
Figure 4:
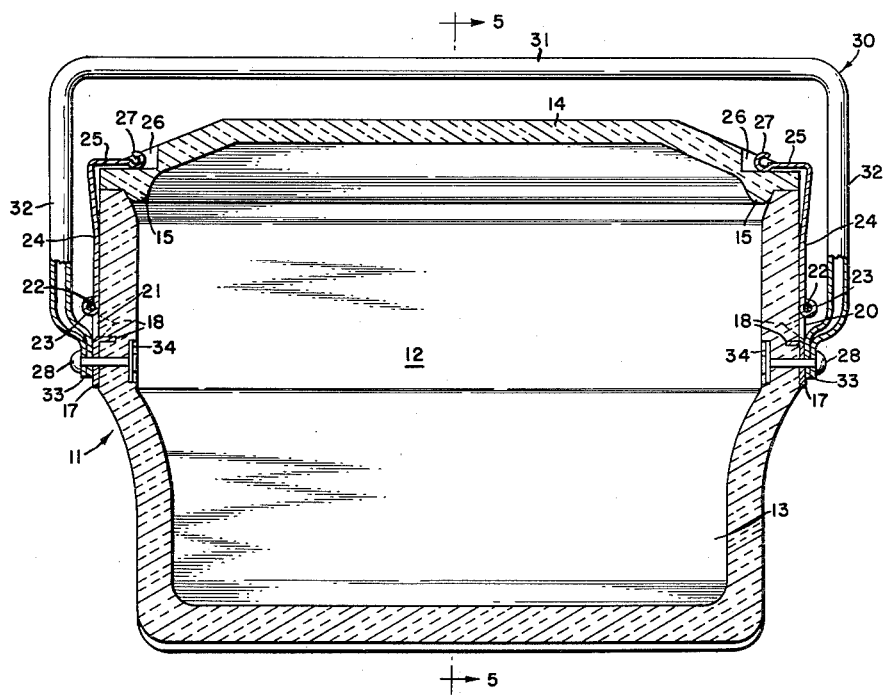
FIG. 4 is a longitudinal sectional view of FIG. 2 on a larger scale.
Figure 5:
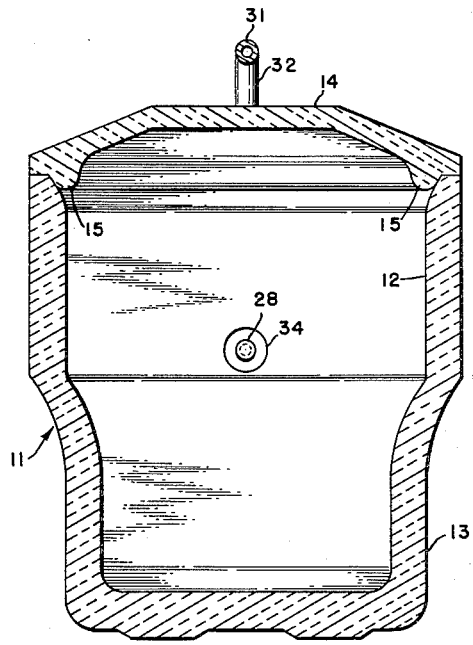
FIG. 5 is a cross-sectional view along the line 5—5 of FIG. 4.

The rivets 28 also function to swivel the ends of a tubular handle 30. This handle comprises a longitudinal bar 31 which is bent at the ends to provide cross arms 32, one at either end. The distance between these two cross arms is slightly greater than the length of the upper section of the box so that when the handle is in its upright position, as shown in FIGS. 1 and 4, they constitute a limiting abutment to prevent accidental disengagement of the latch bar fingers 25 from the cover 14, whereas in either of the side positions (see FIG. 2) the cover 14 may be easily and quickly unlatched.

The ends 33 of the arms 32 are each flattened and offset inwardly against the plate 17 to which they are pivotally connected with the same rivet 28. A recessed pressure plate or washer 34 is provided between the inner end of each rivet 28 and the adjacent inner surface of the container, substantially as shown.

Having thus described my invention, I claim:

1. In a container having opposite end walls of a soft material and a closure lid adjacent said walls, a plate on the exterior of each of said walls, each plate having a group of projections extending therefrom embedded in is respective end wall, a handle for the container having each of its ends adjacent one of said plates, a rivet pivotally attaching each of the handle ends to its respective wall through its adjacent plate and serving thereby to hold the said projections in embedded relation, said plates having also an offset bar, a lid latch hinged at one end to each bar, the opposite end of each lid latch being shaped to form a finger for releasably engaging and holding one end of the lid.

2. The subject matter as defined by claim 1 in which the handle is formed of a hollow tubular material and is bent in the general shape of an elongated inverted U to form end sections parallel to and outwardly offset from the end walls, the tip ends of said handle being flattened and inwardly offset from the remaining portions, respectively, of the end sections, to contact the plates, said plates being also perforated to receive the rivets.

3. A container of rigid polystyrene foam walls having a relatively narrower and shorter lower section and relatively wider and longer upper section to permit nesting a group of the containers to conserve storage and transportation space, said container having an open top, a dome shaped lid adapted to cover said open top, an inverted U-shaped handle straddling said upper section, a pair of plate members attached to the upper section and pivotally supporting the ends of said handle, and latch means for said cover hingedly attached to said plate members between the handle and the outer surface of the upper section.

No references cited.